(12) United States Patent
Tanaka et al.

(10) Patent No.: US 9,932,500 B2
(45) Date of Patent: *Apr. 3, 2018

(54) ADHESIVE TAPE

(71) Applicant: Chukoh Chemical Industries, Ltd., Minato-ku, Tokyo (JP)

(72) Inventors: Kentaro Tanaka, Matsuura (JP); Masayuki Sueishi, Matsuura (JP)

(73) Assignee: Chukoh Chemical Industries, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/631,277

(22) Filed: Jun. 23, 2017

(65) Prior Publication Data

US 2017/0283663 A1  Oct. 5, 2017

Related U.S. Application Data

(63) Continuation of application No. 14/850,034, filed on Sep. 10, 2015, now Pat. No. 9,718,336, which is a (Continued)

(30) Foreign Application Priority Data

Mar. 11, 2013 (JP) ................... 2013-048389

(51) Int. Cl.
*C09J 7/02* (2006.01)
*B32B 27/08* (2006.01)
(Continued)

(52) U.S. Cl.
CPC ............... *C09J 7/0278* (2013.01); *B32B 7/12* (2013.01); *B32B 27/08* (2013.01); *B32B 27/20* (2013.01); *B32B 27/322* (2013.01); *C09J 7/0246* (2013.01); *B32B 2307/702* (2013.01); *B32B 2405/00* (2013.01); *C09J 183/04* (2013.01);
(Continued)

(58) Field of Classification Search
None
See application file for complete search history.

(56) References Cited

U.S. PATENT DOCUMENTS 3,833,455 A    9/1974   Rosenblatt, Jr. et al.
4,774,297 A    9/1988   Murakami et al.
(Continued)

FOREIGN PATENT DOCUMENTS

JP          9-3415 A        1/1997
JP      2008-166451 A      7/2008
(Continued)

OTHER PUBLICATIONS

Hideichi Takahashi et al., "Adhesive Tape and Manufacturing Method Thereof", English translation of JP 09003415A, published on Jan. 7, 1997.*

(Continued)

*Primary Examiner* — Anish Desai
(74) *Attorney, Agent, or Firm* — Christensen O'Connnor Johnson Kindness PLLC

(57) ABSTRACT

According to one embodiment, an adhesive tape includes a film and an adhesive layer. The film includes polytetrafluoroethylene and a carbon filler. The adhesive layer is provided on a surface of the film, and includes a silicone pressure-sensitive adhesive.

3 Claims, 7 Drawing Sheets

Related U.S. Application Data continuation of application No. PCT/JP2013/073006, filed on Aug. 28, 2013.

(51) Int. Cl.
  *B32B 27/20* (2006.01)
  *B32B 27/32* (2006.01)
  *B32B 7/12* (2006.01)
  *C09J 183/04* (2006.01)

(52) U.S. Cl.
  CPC .... *C09J 2201/606* (2013.01); *C09J 2205/106* (2013.01); *C09J 2427/006* (2013.01); *C09J 2483/00* (2013.01)

(56) References Cited

U.S. PATENT DOCUMENTS

| | | | |
|---|---|---|---|
| 4,985,296 | A | 1/1991 | Mortimer, Jr. |
| 5,415,939 | A | 5/1995 | Yeung |
| 5,551,706 | A | 9/1996 | Barna et al. |
| 6,089,576 | A | 7/2000 | Hollenbaugh, Jr. et al. |
| 7,179,525 | B2 | 2/2007 | Dove |
| 9,718,336 | B2 * | 8/2017 | Tanaka .................... C09J 7/0278 |
| 2004/0038026 | A1 | 2/2004 | Li et al. |
| 2004/0140457 | A1 | 7/2004 | Service |
| 2004/0242758 | A1 | 12/2004 | Shih et al. |
| 2005/0250909 | A1 | 11/2005 | Hammar et al. |
| 2010/0092759 | A1 | 4/2010 | Fan et al. |
| 2010/0151180 | A1 | 6/2010 | Bravet et al. |
| 2011/0086206 | A1 * | 4/2011 | Scheffer .................. C09D 5/24 |
| | | | 428/195.1 |
| 2011/0156353 | A1 | 6/2011 | Kabutoya et al. |
| 2014/0120344 | A1 | 5/2014 | Yamamoto et al. |

FOREIGN PATENT DOCUMENTS

| | | |
|---|---|---|
| JP | 2009-40901 A | 2/2009 |
| JP | 2009-083593 A | 4/2009 |
| JP | 2009-023657 A | 5/2009 |
| JP | 2009-197041 A | 9/2009 |
| JP | 2010-167642 A | 8/2010 |
| JP | 2012-107125 A | 6/2012 |
| JP | 2012-169573 A | 9/2012 |
| WO | 2012/172934 A1 | 12/2012 |

OTHER PUBLICATIONS

First Chinese Office Action, dated Feb. 15, 2017, issued in corresponding Chinese Application No. CN 2013800744861, filed Aug. 28, 2013, 15 pages.

First Office Action mailed Sep. 10, 2013, issued in corresponding Japanese Application No. 2013-048389, filed Mar. 11, 2013, 4 pages.

Final Office Action dated Nov. 26, 2013, issued in corresponding Japanese Application No. 2013-048389, filed Mar. 11, 2013, 4 pages.

International Preliminary Examination Report dated Sep. 15, 2015, issued in corresponding International Application No. PCT/JP2013/073006, filed Aug. 28, 2013, 11 pages.

International Search Report mailed Dec. 10, 2013, issued in corresponding International Application No. PCT/JP2013/073006, filed Aug. 28, 2013, 5 pages.

Uneo, S., et al., "Method of Manufacturing Adhesive Tape or Sheet," English translation of JP 03-064382A, dated Mar. 19, 1991.

Wypych, G., "Handbook of Fillers," 2010, ChemTec Publishing, Ontario, Canada, 3rd ed., pp. 53-63.

2nd Chinese Office Action, dated Sep. 18, 2017, issued in corresponding Chinese Application No. CN 2013800744861, filed Aug. 28, 2013, 11 pages.

* cited by examiner

ADHESIVE TAPE

CROSS-REFERENCES TO RELATED APPLICATIONS

This application is a continuation of application Ser. No. 14/850,034, filed Sep. 10, 2015, which is a continuation application of PCT Application No. PCT/JP2013/073006, filed Aug. 28, 2013; and based upon and claiming the benefit of priority from prior Japanese Patent Application No. 2013-048389, filed Mar. 11, 2013, the entire contents of all of which are incorporated herein by reference.

BACKGROUND

A lower end of a windshield of an automobile is supported by a part called a cowl top (Patent Literatures 1 and 2). In a portion in which the windshield and the cowl top are brought into contact with each other, sliding is caused by vibration, impact, and torsion and the like caused by traveling. When the windshield and the cowl top are directly brought into contact with each other, jarring may occur from the lower end of the windshield during the sliding, or the windshield may be damaged or broken. Therefore, an adhesive tape is provided between the windshield and the cowl top in order to reduce the impact due to the sliding on the windshield.

The adhesive tape forms part of the appearance of the automobile, and is visually recognized by an automobile driver and the like. Therefore, the state in which the adhesive tape is stuck is desirably attractive. However, a conventional adhesive tape is apt to have poor appearance due to sticking work or partial change. Even if the adhesive tape has no problem in a main function for sliding when the adhesive tape has poor appearance, the adhesive tape creates an overall low quality impression of the automobile.

Therefore, it is required to develop a tape which exhibits an original function to suppress the occurrence of the jarring from the lower end of the windshield, and damage and breakage of the windshield, and simultaneously provides excellent appearance.

CITATION LIST

Patent Literature

[Patent Literature 1] Jpn. Pat. Appln, KOKAI Publication No. 2009-23657
[Patent Literature 2] Jpn. Pat. Appln. KOKAI Publication No. 2009-83593

BRIEF SUMMARY OF THE INVENTION

Technical Problem

It is an object of the present invention to provide an adhesive tape exhibiting excellent appearance when it is used between a windshield and a cowl top.

Solution to Problem

According to one embodiment, an adhesive tape includes a film and an adhesive layer. The film includes polytetrafluoroethylene and a carbon filler. The adhesive layer is provided on a surface of the film, and includes a silicone pressure-sensitive adhesive.

Effect of Invention

The adhesive tape according to the present invention exhibits excellent appearance when it is used between a windshield and a cowl top.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described in detail with reference to the drawings.

Figure 1:
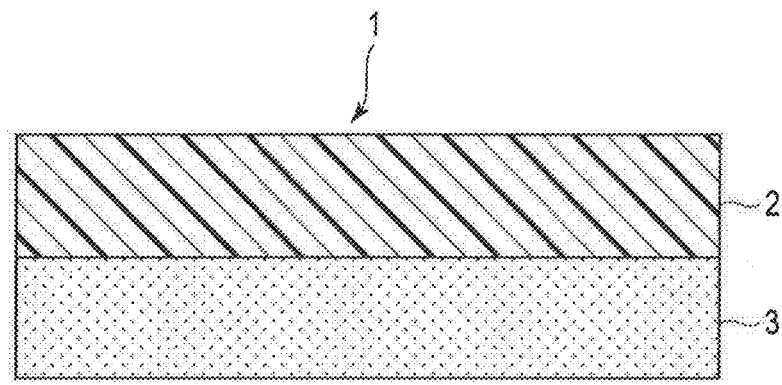
FIG. 1 is a sectional view showing an adhesive tape according to one embodiment.

FIG. 1 is a sectional view schematically showing an adhesive tape according to one embodiment. An adhesive tape 1 according to one embodiment includes a film 2 and an adhesive layer 3 provided on a surface of the film 2.

The adhesive tape 1 may be provided in a state where it is taken up in a roll form as in a general tape, or may be provided in a state where a release sheet is made to adhere to the adhesive layer v. The adhesive tape 1 may have the same length and width as those of an adhesive tape generally used for a contact part of a windshield and a cowl top.

The film 2 includes polytetrafluoroethylene (PTFE) and a carbon filler. The film 2 may have a thickness of, for example, 25 to 300 µm. From the viewpoint of workability, the film 2 has a thickness of, preferably 50 to 100 µm, and particularly preferably about 80 µm.

The carbon filler is a material containing carbon. The PTFE film contains the carbon filler, and thereby the film 2 is colored in black. The carbon filler is contained in the film 2 in such amount that the film 2 is appropriately colored without impairing the quality of the film 2. The amount of the carbon filler is, for example, 0.8 wt % to 10 wt %. Examples of the carbon filler include carbon black. In particular, amorphous carbon black can be used. The primary particle size of the amorphous carbon black may be set to, for example, 10 nm to 100 nm.

The adhesive layer 3 exhibits an adherence property with respect to an adherend surface. The adhesive layer 3 contains a silicone pressure-sensitive adhesive. A silicone pressure-sensitive adhesive having high weather resistance is preferably used. Examples of the silicone pressure-sensitive adhesive include a peroxide cure type silicone pressure-sensitive adhesive and an addition cure type silicone pressure-sensitive adhesive. Specific examples of the silicone pressure-sensitive adhesive include a silicone pressure-sensitive adhesive obtained from a material containing a silicone gum and a silicone resin. For example, an organopolysiloxane containing dimethylsiloxane as a main structural unit can be used as the silicone gum. For example, an MQ resin containing an M unit of $R_3SiO_{1/2}$ and a Q unit of $SiO_2$ can be used as the silicone resin. The adhesive layer 3 has a thickness of, for example, 30 to 70 μm, and preferably about 50 μm.

The adhesive tape according to the embodiment can be used for the contact portion of the windshield and the cowl top.

Figure 2:
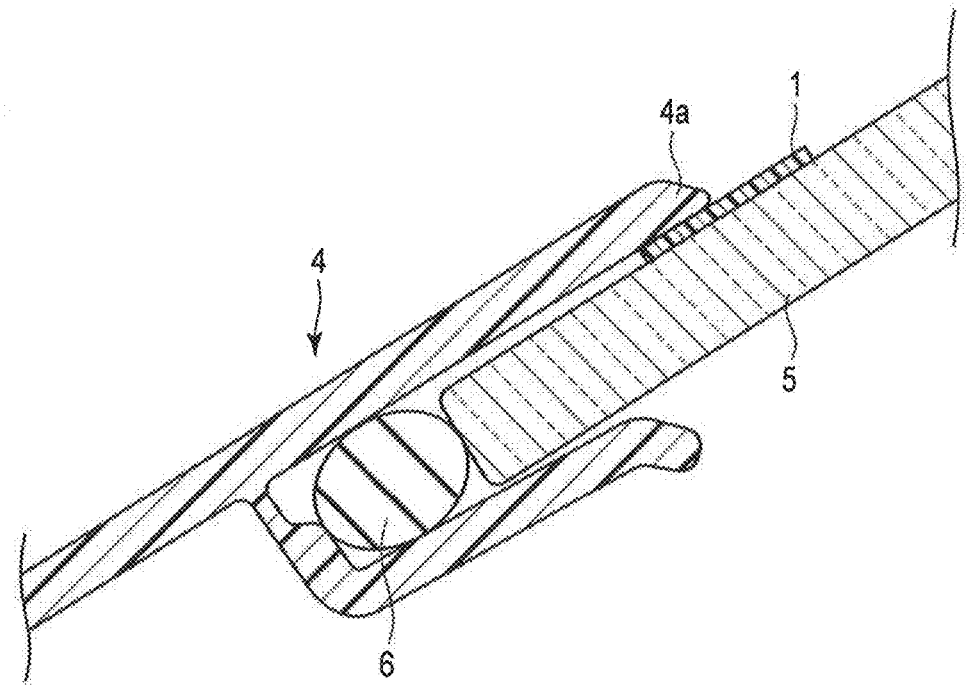
FIG. 2 is a sectional view showing a condition in which an adhesive tape according to one embodiment is used.

FIG. 2 is a sectional view of a contact portion of a cowl top 4 and a windshield 5 as viewed from a side surface side of an automobile. A lower end of the windshield 5 is inserted into a groove formed in the cowl top 4. As a result, the windshield 5 is supported by the cowl top 4. A sealing member 6 is provided between the lower end of the windshield 5 and the cowl top 4. The adhesive tape 1 according to the embodiment is interposed between the windshield 5 and a contact part 4a of the cowl top 4. The adhesive tape 1 can be stuck on the three-dimensionally curved windshield 5 in accordance with the shape of the windshield 5.

When the adhesive tape according to the embodiment is used between the windshield and the cowl top, the adhesive tape achieves an effect which cannot be achieved by a conventional adhesive tape. That is, the adhesive tape according to the embodiment exhibits an original function to suppress the occurrence of jarring from the lower end of the windshield, and the damage and breakage of the windshield, and simultaneously provides excellent appearance.

Figure 3:
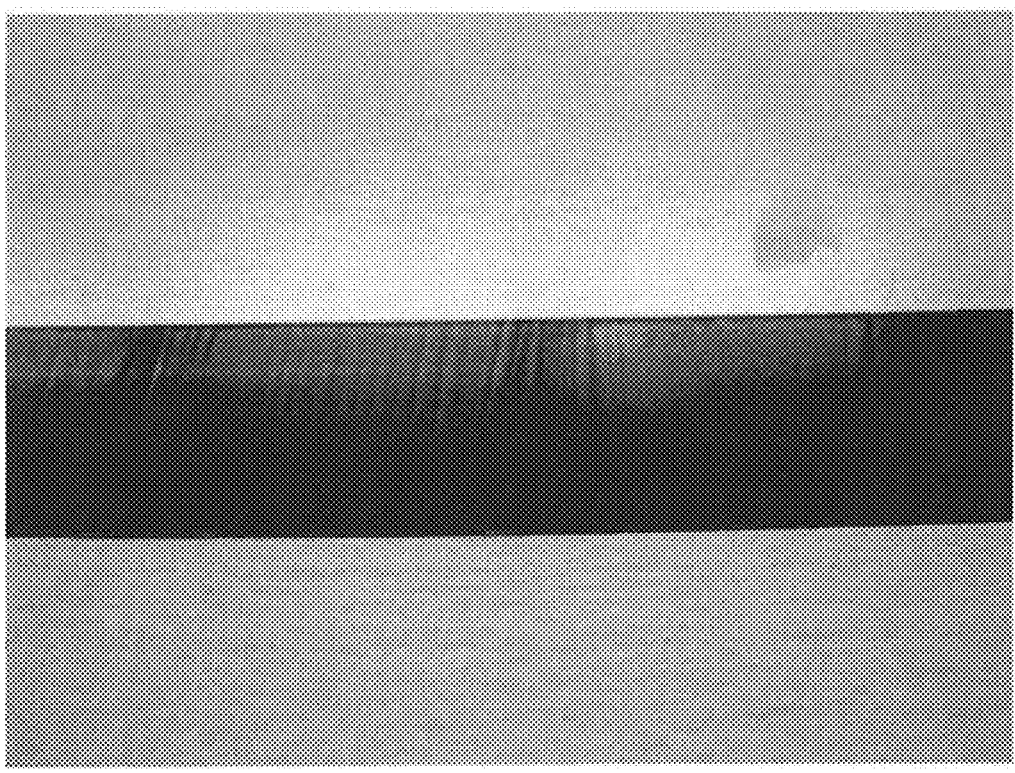
FIG. 3 is a photograph showing an adhesive tape according to a Comparative Example.

The conventional adhesive tape is generally provided in a state where it is taken up in a roll form. When the adhesive tape is taken from a roll, the surface of the tape may be roughened as stripes as shown in FIG. 3. This is considered to be caused by a strong pressure-sensitive adhesion moment and a sudden separation moment alternately occurring between a pressure-sensitive adhesive layer and an adherend surface thereof (a surface of the film on which the pressure-sensitive adhesive layer is not provided) when the tape is taken from the roll. Such a phenomenon called the stick-slip phenomenon.

The conventional adhesive tape is not suitable for resticking. The adhesive tape is manually stuck on the windshield in many cases, which makes it necessary to restick the adhesive tape in many cases. When the conventional adhesive tape is stuck and then removed, a pressure-sensitive adhesive surface is roughened, and observable marks caused by the resticking remain, which makes it necessary to break the tape itself depending on circumstances.

Furthermore, the conventional adhesive tape has low weather resistance. As time passes after the conventional adhesive tape is stuck, wrinkles and partial or overall contraction are apt to occur in the tape.

On the other hand, when the adhesive tape according to the embodiment is taken from a state where it is taken so in a roll form, the stripe-like roughness of the surface does not occur. This can provide an attractive appearance when the adhesive tape is stuck.

The adhesive tape according to the embodiment can be attractively restuck without causing the roughness of the pressure-sensitive adhesive surface and the marks caused by the resticking even when the tape is removed after being stuck.

Furthermore, in the adhesive tape according to the embodiment, wrinkles and contraction are less likely to occur even as time passes, which provides high weather resistance.

As a result, the adhesive tape according to the embodiment can provide an excellent appearance.

Furthermore, carbon black is used as the carbon filler in the adhesive tape according to the embodiment, and thereby the adhesive tape is sufficiently colored in black, and the appearance of the overall automobile is not impaired.

In the adhesive tape according to the embodiment, the amount of the carbon filler contained in the film is set to 0.8 wt % to 10 wt %, and thereby an adhesive tape which is sufficiently colored and maintains the quality of the film can be provided.

In the adhesive tape according to the embodiment, the peroxide cure type silicone pressure-sensitive adhesive or the addition cure type silicone pressure-sensitive adhesive is used as the silicone pressure-sensitive adhesive, and thereby a pressure-sensitive adhesive tape having high weather resistance can be provided.

In the adhesive tape according to the embodiment, a silicone pressure-sensitive adhesive obtained from materials including a silicone gum and a silicone resin is used as the silicone pressure-sensitive adhesive, and thereby a pressure-sensitive adhesive tape having higher weather resistance can be provided.

In the adhesive tape according to the embodiment, the thickness of the film is set to 25 μm to 300 μm, and thereby an adhesive tape which is sufficiently colored and maintains the quality of the film can be provided.

Examples (1) Consideration of Thickness of Film and Amount of Carbon Filler

Various films were manufactured, and an optimal thickness and an amount of a carbon filler were considered. Poor coloring, occurrence of holes called pinholes in the film, and deterioration of film-forming property are caused depending on the amount of the filler, which makes it important to determine the optimal amount of the filler.

The carbon filler was added into a PTFE resin, and the PTFE resin containing the carbon filler was then subjected to billet molding, sintering, and cutting. When the carbon filler was added, the amount of the carbon filler was set to nine amounts: 0.5 wt %, 0.8 wt %, 1 wt %, 3 wt %, 5 wt %, 8 wt %, 10 wt %, 12 wt %, and 15 wt %. Furthermore, in cutting, the thickness was set to six amounts: 25 μm, 50 μm, 80 μm, 100 μm, 200 μm, and 300 μm. In total, 54 kinds of the films were manufactured.

It was determined whether sufficient coloring, occurrence of pinholes, and occurrence of fracture in cutting are caused in each of the manufactured films. The results are shown in the following Table 1.

TABLE 1

| | | Amount of carbon filler (% by weight) | | | | | | | |
|---|---|---|---|---|---|---|---|---|---|
| | | 0.5 | 0.8 | 1 | 3 | 5 | 8 | 10 | 12 | 15 |
| Thickness (μm) | 25 | T | T | T | Good | Good | PS | PS | PS | PS |
| | 50 | T | T | T | Good | Good | Good | PS | PS | PS |
| | 80 | T | T | Good | Good | Good | Good | Good | PS | PS |
| | 100 | T | T | Good | Good | Good | Good | Good | PS | PS |
| | 200 | T | Good | Good | Good | Good | Good | P | P | P |
| | 300 | T | Good | Good | Good | Good | Good | P | P | P |

In Table 1, films each having poor coloring were represented as "T". Films each having pinholes were represented as "P". Films each having fracture in cutting were represented as "S". Films each having good coloring, no pinholes, and no fracture were represented as "good".

From Table 1, it was found that, in films each having a thickness of about 25 μm, for example, 20 to 40 μm, a fill amount of 1 wt % or less caused patchy dispersion to result in poor coloring, and a fill amount of 8% or more caused pinholes and fracture. It was found that, in films each having a thickness of about 50 μm, for example, 40 to 70 μm, a fill amount of 1 wt % or less caused patchy dispersion to result in poor coloring, and a fill amount of 10% or more caused pinholes and fracture. It was found that, in films each having a thickness of about 80 μm and about 100 μm, for example, 70 to 150 μm, a fill amount of 0.8 wt % or less caused patchy dispersion to result in poor coloring, and a fill amount of 12% or more caused pinholes and fracture. It was found that, in films each having a thickness of about 200 μm and about 300 μm, for example, 150 to 350 μm, a fill amount of 0.5 wt % or less caused patchy dispersion to result in, poor coloring, and a fill amount of 10% or more caused pinholes.

(2) Consideration of Thickness of Film and Pressure-Sensitive Adhesive

The presence or absence of stripe-like unevenness caused by a stick-slip phenomenon was investigated for various pressure-sensitive adhesive tapes having different film thicknesses and containing different pressure-sensitive adhesives.

A natural rubber-based pressure-sensitive adhesive, an acrylic pressure-sensitive adhesive, and a silicone-based, pressure-sensitive adhesive are generally used as the pressure-sensitive adhesive of the pressure-sensitive adhesive tape. The acrylic pressure-sensitive adhesive and the silicone-based pressure-sensitive adhesive were selected as a pressure-sensitive adhesive having heat resistance and weather resistance suitable for use in an automobile. Each of the two pressure-sensitive adhesives was applied to a surface of each of six films having different thicknesses, and the films were formed in a roll form. The thicknesses of the six films were set to 25 μm, 50 μm, 80 μm, 100 μm, 200 μm, and 300 μm. It was determined whether stripe-like poor appearance occurred when the 12 manufactured pressure-sensitive adhesive tapes in total were taken from a roll and whether marks caused by resticking occurred. The results are summarized in the following Table

TABLE 2

| | | Acrylic pressure-sensitive adhesive | | Silicon-based pressure-sensitive adhesive | |
|---|---|---|---|---|---|
| | | Stripe-like poor appearance | Resticking marks | Stripe-like poor appearance | Resticking marks |
| Thickness (μm) | 25 | Poor | Poor | Good | Good |
| | 50 | Poor | Poor | Good | Good |
| | 80 | Poor | Poor | Good | Good |
| | 100 | Poor | Poor | Good | Good |
| | 200 | Good | Good | Good | Good |
| | 300 | Good | Good | Good | Good |

In Table 2, a case where the stripe-like poor appearance occurred and a case where the resticking marks occurred were represented as "poor". A case where the stripe-like poor appearance did not occur and a case where the marks caused by resticking did not occur were represented as "good".

It was found that the stripe-like poor appearance and the sticking marks occurred when the pressure-sensitive adhesive tape containing the acrylic pressure-sensitive adhesive had a film thickness of 100 μm or less. On the other hand, it was found that the stripe-like poor appearance and the sticking marks did not occur in all the thicknesses of the pressure-sensitive adhesive tape containing the silicone-based pressure-sensitive adhesive. It was found that the pressure-sensitive adhesive tape having a film thickness of 25 μm had poor resticking workability.

(3) Consideration of Appearance when Pressure-Sensitive Adhesive Tape is Stuck on Windshield The pressure-sensitive adhesive tape containing the acrylic pressure-sensitive adhesive and the pressure-sensitive adhesive tape containing the silicone-based pressure-sensitive adhesive were stuck on the windshield of the automobile, and the appearances of the pressure-sensitive adhesive tapes were considered.

As a result, when the pressure-sensitive adhesive tape containing the acrylic pressure-sensitive adhesive was taken from the roll, a stick-slip phenomenon occurred. As a result, stripe-like unevenness as shown in FIG. 3 occurred. On the other hand, the stick-slip phenomenon did not occur in the pressure-sensitive adhesive tape containing the silicone-based pressure-sensitive adhesive, and the stuck tape had good appearance on which wrinkles and the like did not occur.

(4) Consideration of Change with Passage of Time

Figure 4:
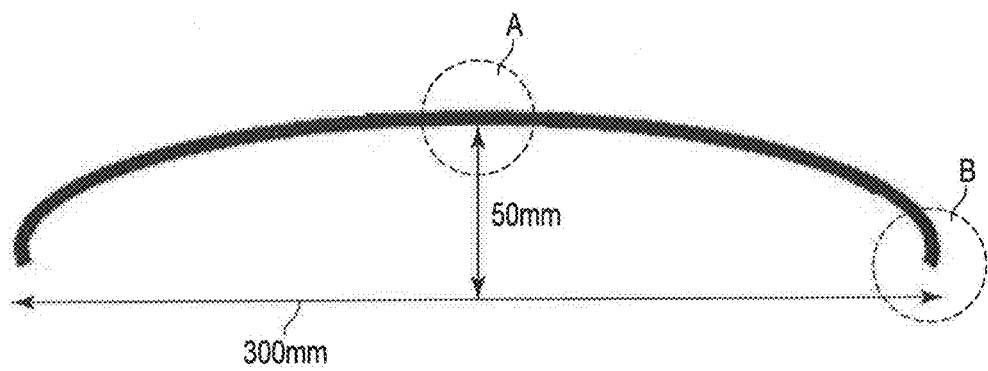
FIG. 4 shows how to stick an adhesive tape in a weather resistance test.

Each of the pressure-sensitive adhesive tape containing the acrylic pressure-sensitive adhesive and the pressure-sensitive adhesive tape containing the silicone-based pressure-sensitive adhesive was stuck on a SUS plate having a semicircular-arc form as shown in FIG. 4, and subjected to a weather resistance test corresponding to the passage of one year using a sunshine weather meter. In a test condition, an ultraviolet irradiation amount was set to 135 MJ/m² (corresponding to an outdoor exposure test for one year).

Figure 5:
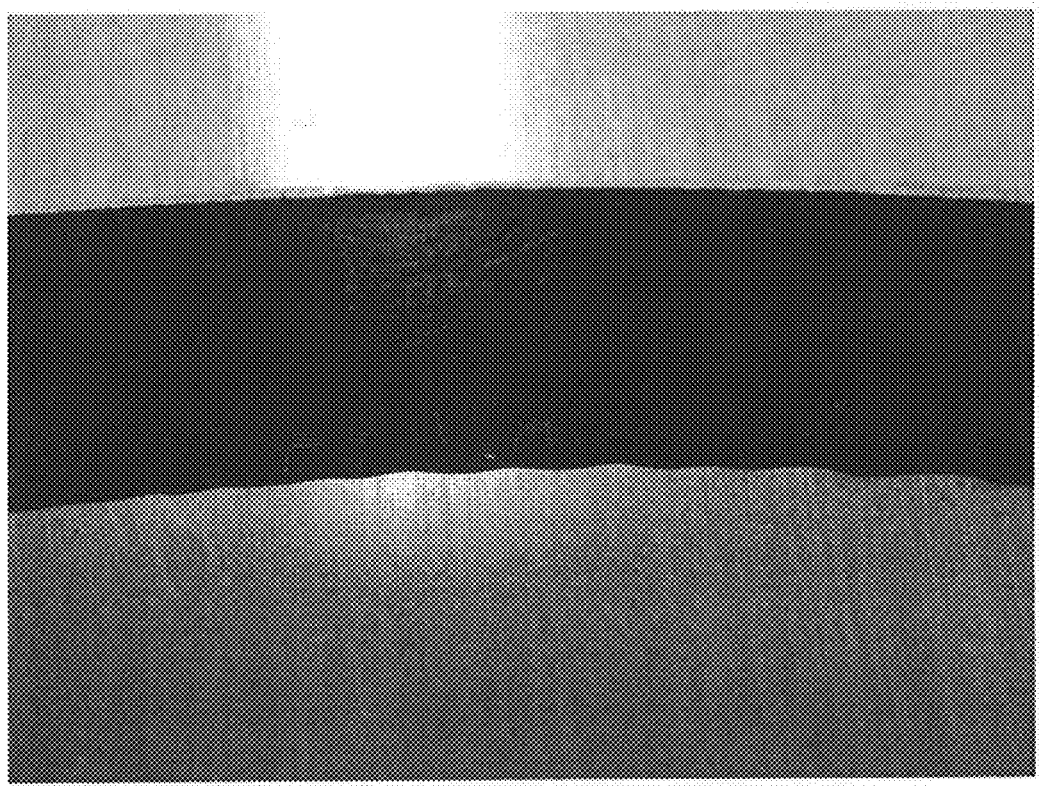
FIG. 5 is a photograph showing the results of an adhesive tape according to a Comparative Example in a weather resistance test.
Figure 6:
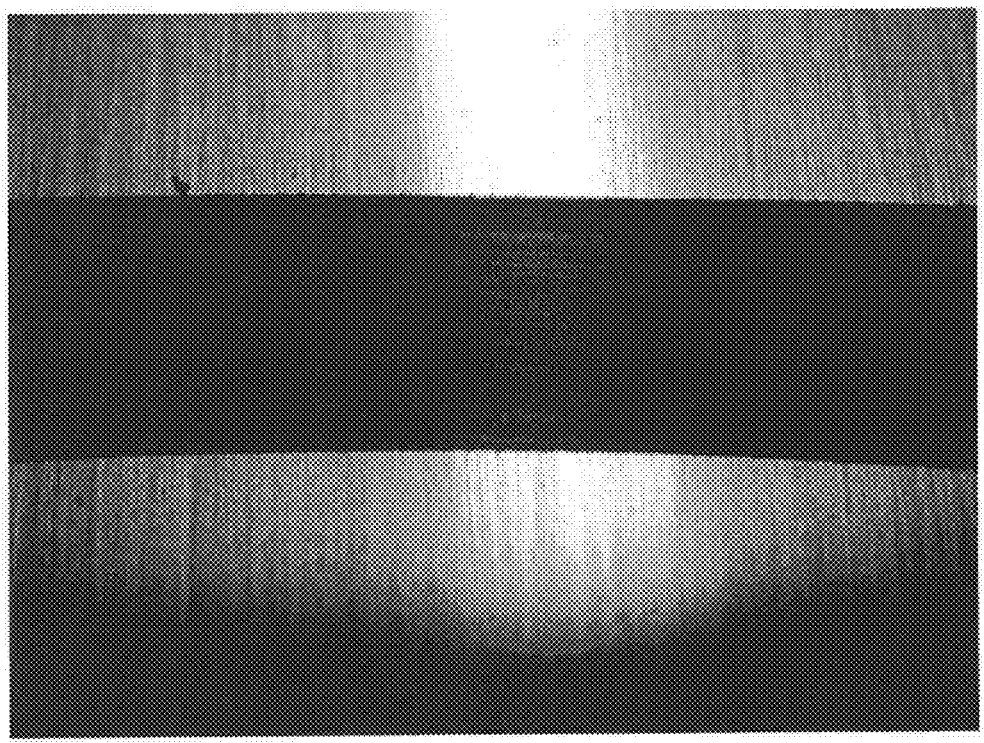
FIG. 6 is a photograph showing the results of an adhesive tape according to one embodiment in a weather resistance test.

FIGS. 5 and 6 are photographs showing conditions after the weather resistance tests of the pressure-sensitive adhesive tape containing the acrylic pressure-sensitive adhesive and the pressure-sensitive adhesive tape containing the silicone-based, pressure-sensitive adhesive. In FIGS. 5 and 6, a portion represented by A in FIG. 4 is magnified and shown.

From FIG. 5, it is found that wrinkles occur on a semi-circular-arc inner diameter side in the pressure-sensitive adhesive tape containing the acrylic pressure-sensitive adhesive. On the other hand, from FIG. 6, it is found that the pressure-sensitive adhesive tape containing the silicone-based pressure-sensitive adhesive maintains good appearance without being changed from a state before it is subjected to the weather resistance test.

Figure 7:
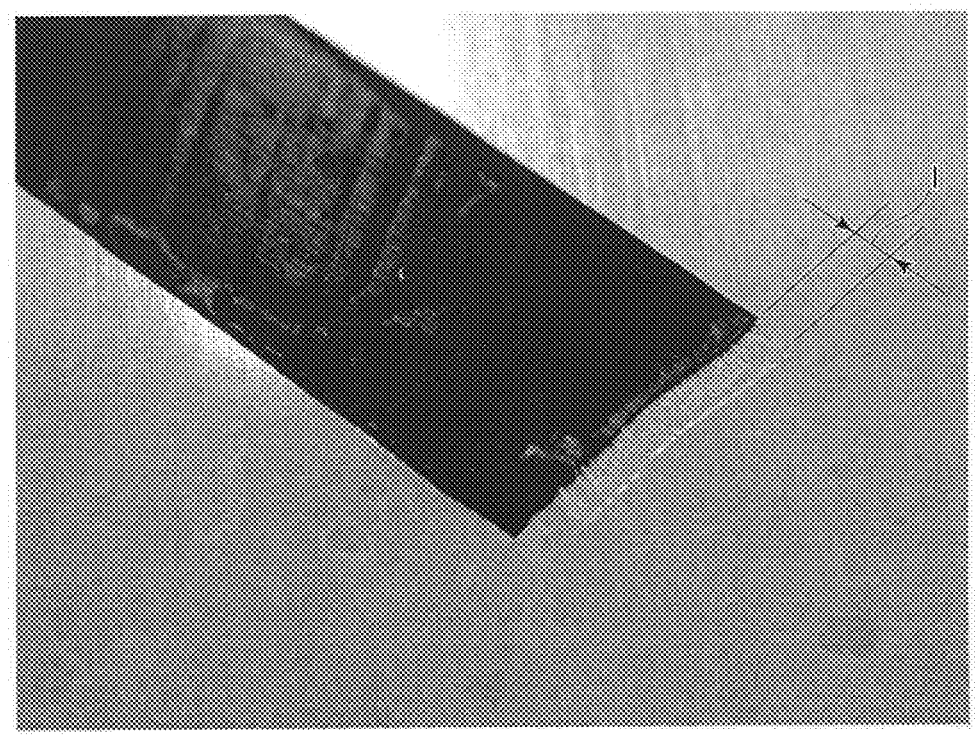
FIG. 7 is a photograph showing the results of an adhesive tape according to a Comparative Example in a weather resistance test.
Figure 8:
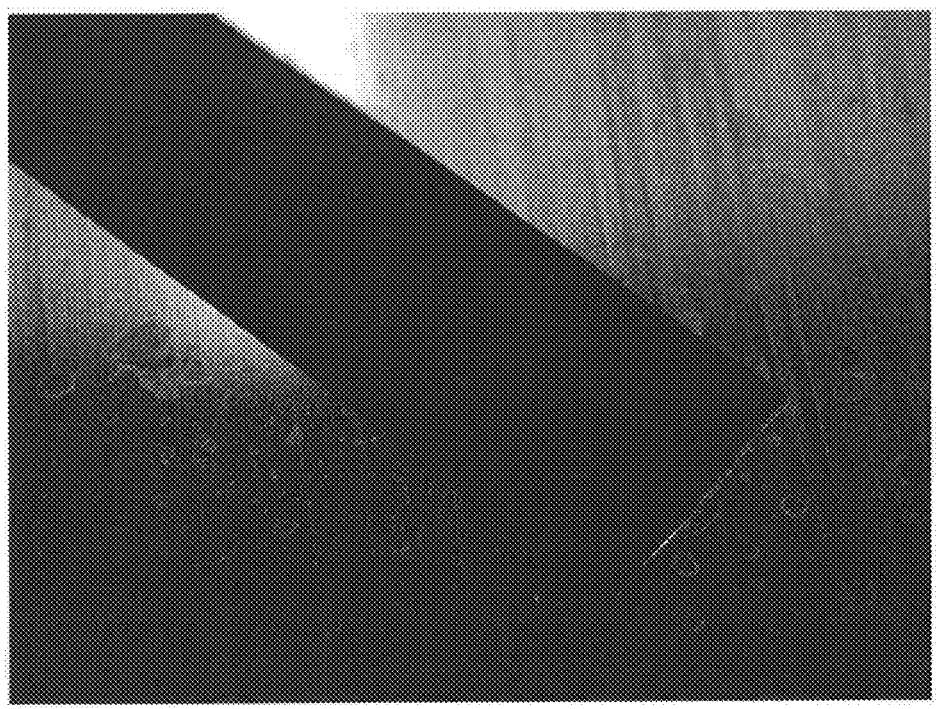
FIG. 8 is a photograph showing the results of an adhesive tape according to one embodiment in a weather resistance test.

FIGS. 7 and 8 are photographs showing conditions after the weather resistance tests of the pressure-sensitive adhesive tape containing the acrylic pressure-sensitive adhesive and the pressure-sensitive adhesive tape containing the silicone-based pressure-sensitive adhesive. In FIGS. 7 and 8, a portion represented by B in FIG. 4 is magnified and shown.

As shown FIG. 7, in the pressure-sensitive adhesive tape containing the acrylic pressure-sensitive adhesive, the pressure-sensitive adhesive was exposed by a length "l (L)" from the end of the tape. From this, it is found that the tape is contracted by at least the length "l". Furthermore, it is found that the wrinkles occur on the tape itself. On the other hand, from FIG. 8, it is found that the pressure-sensitive adhesive tape containing the silicone-based pressure-sensitive adhesive maintains good appearance without being changed from a state before it is subjected to the weather resistance test.

It is considered that these differences in the two tapes are caused by the difference in the properties of the pressure-sensitive adhesives. Since the acrylic pressure-sensitive adhesive is softened under a high temperature atmosphere, and cannot suppress the contractive force of the film, the wrinkles and the contraction are considered to occur. On the other hand, it is considered that the silicone-based pressure-sensitive adhesive is not softened under a high temperature atmosphere, and the cohesive force of the pressure-sensitive adhesive suppresses the contractive force of the film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An adhesive tape comprising:
a film comprising polytetrafluoroethylene and a carbon filler; and
an adhesive layer provided on a surface of the film, and consisting of a silicone pressure-sensitive adhesive,
wherein the carbon filler is amorphous carbon black, and a primary particle size of the amorphous carbon black falls within a range of 10 nm to 100 nm, and
the film satisfies a first condition or a second condition, the first condition being a condition where a content of the carbon filler in the film falls within a range of 1 wt % to 10 wt % and the film has a thickness of 80 μm to 100 μm, and the second condition being a condition where the content of the carbon filler in the film falls within a range of 0.8 wt % to 8 wt % and the film has a thickness of 200 μm to 300 μm.

2. The adhesive tape according to claim 1, wherein the silicone pressure-sensitive adhesive comprises a peroxide cure silicone pressure-sensitive adhesive or an addition cure silicone pressure-sensitive adhesive.

3. The adhesive tape according to claim 1, wherein the silicone pressure-sensitive adhesive is obtained from a material comprising a silicone gum and a silicone resin.

* * * * *